Aug. 30, 1927.
G. W. GARTNER
1,640,930
VEHICLE LOAD SCALE
Filed March 25, 1926
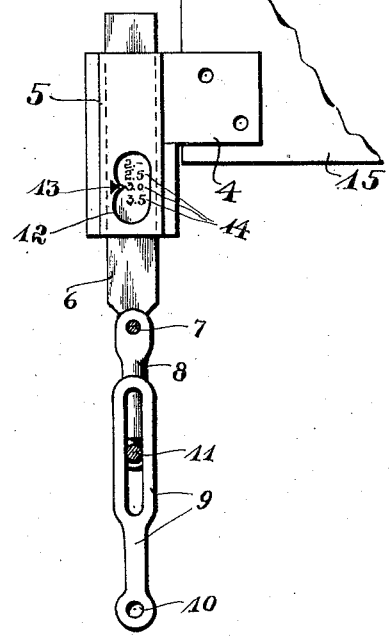
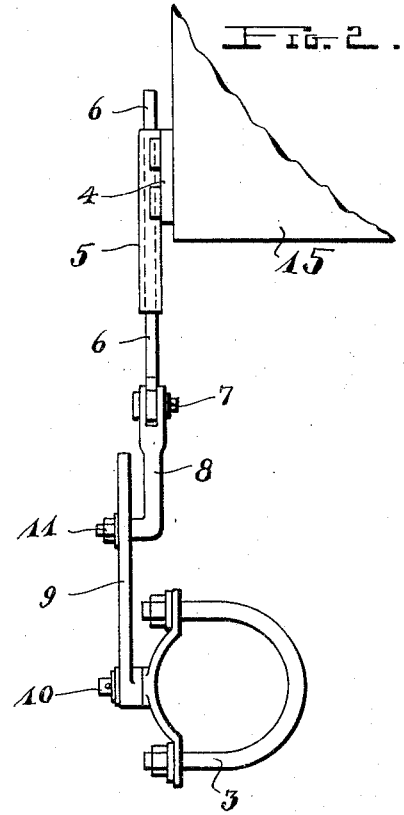
INVENTOR
GUSTAV W. GARTNER,
By: his Atty.

Patented Aug. 30, 1927.

1,640,930

UNITED STATES PATENT OFFICE.

GUSTAV W. GARTNER, OF MAYWOOD, CALIFORNIA.

VEHICLE LOAD SCALE.

Application filed March 25, 1926. Serial No. 97,299.

This invention relates to devices by which the weight of a load on a vehicle may be determined or ascertained without placing the truck with the load on any customary scale.

One of the objects of this invention is to provide a device that can easily be attached to a vehicle to safeguard against overloading the vehicle, especially when loading material that is subject to changing its weight through dampness or similar causes.

Another object is to provide a device that may be disposed between the axle and the platform or chassis of a truck or other vehicle so as to indicate the pressure bearing on the chassis through the variations of the space between the chassis and the axle.

Another object is to provide a device which may be adjusted to indicate the weight added to a load after such adjustment.

Other objects will appear from the following description and appended claims as well as from the accompanying drawing, in which—

Fig. 1 is a fragmentary front elevation of the device embodying this invention, the axle yoke being left off.

Fig. 2 is a side elevation of the device with the axle-yoke attached.

In loading vehicles it is difficult to ascertain the weight of material that is being placed on the vehicle, and an overloading may easily happen especially with material with tendencies of absorbing moisture, and it is therefore desirable for the owner or operator of a truck or vehicle to have an indicator by which, at least, the approximate weight of a load may be established, to avoid accidents or a breaking down of the vehicle.

This invention embodies means by which a safe loading may be assured.

As illustrated in the drawing, the yoke 3 may serve to attach the device to the axle of a vehicle, and the upper attachment 4 may be secured to a suitable part of the chassis or platform of the vehicle.

The sliding interconnection between the parts 5 and 6 allows a free movement of the chassis in relation to the axle of the vehicle.

A pivot connection 7 is provided to allow a sidewise swinging of the chassis in relation to the axle of the vehicle, since a chassis is now commonly supported by comparatively flexible springs, really necessitating such a pivot interconnection.

The link portion 8 forms the continuation of the bolt 6. Another link-portion 9 is pivotally connected to the axle-yoke 3, as indicated at 10. These two link-portions 8 and 9 form and embody the adjusting means of this device, being adjustably but firmly interconnected at 11, so as to allow a lengthening or shortening of the link between the chassis and the axle.

The sleeve member 5 is provided with a sight-opening 12 embodying an indicating point 13. Weight-indicating figures are provided on the bolt 6, to be seen through the sight-opening, and to align with the indicating point 13.

The indicating figures may be in pounds or tons or any other desired measurement, as half-, full-load, and so on.

As the distance between the chassis and the axle may vary through a change of springs between the axle and the chassis or through other incidents, and to allow the ascertaining of the weight added to a load after the chassis has already been forced down by a part load, the adjusting means serve also to take care of such occurrences by allowing an adjusting of the indicating means to zero at any moment, and so as to indicate any desired weight measurement.

Having thus described my invention, I claim:

1. In a vehicle-load scale, a clamping member adapted to be attached to the axle of a vehicle, a telescopic connecting rod inserted between the chassis of the vehicle and the said clamping member and embodying adjusting means by which the length of the rod can be adjusted, and weight-indicating means at certain points of the telescoping rod in certain relations to the loading positions of the chassis and adapted to indicate added loads by the adjustability of the said rod.

2. In a vehicle-load scale, a clamping member adapted to be attached to the axle of a vehicle, a telescopic weight indicating connecting rod having means to be attached to the chassis of the vehicle at one end and having adjustable connecting means at the other end to be attached to said clamping member and adapted to allow an adjusting to zero for indicating added loads.

In testimony that I claim the foregoing as my invention I have signed my name.

GUSTAV W. GARTNER.